United States Patent [19]

Quirijnen

[11] Patent Number: 5,322,302
[45] Date of Patent: Jun. 21, 1994

[54] SAW-BLADE FIXATION DEVICE

[75] Inventor: Antonius J. J. Quirijnen, Molenschot, Netherlands

[73] Assignee: Skil Europe B.V., Netherlands

[21] Appl. No.: 98,710

[22] Filed: Jul. 28, 1993

[30] Foreign Application Priority Data

Jul. 29, 1992 [NL] Netherlands ............... 9201371

[51] Int. Cl.⁵ ............................................. B27B 19/02
[52] U.S. Cl. ................................. 279/22; 30/338; 30/392; 279/24; 279/30; 279/77
[58] Field of Search .................. 279/22, 24, 29, 30, 279/76–78; 30/392–394, 337–339; 83/697, 698

[56] References Cited

U.S. PATENT DOCUMENTS 3,555,678 1/1971 Agulnick et al. .................... 30/166
4,106,181 8/1978 Mattchen ............................ 83/698 X
4,601,477 7/1986 Barrett et al. ....................... 279/30

FOREIGN PATENT DOCUMENTS 2257376 8/1975 France .

Primary Examiner—Steven C. Bishop
Attorney, Agent, or Firm—Jones, Day, Reavis & Pogue

[57] ABSTRACT

The invention relates to a device for mounting a saw-blade provided with an opening to a carrier which is connected to a drive device to make a reciprocating movement, wherein the device comprises: a wall extending in the direction of movement which is suitable for contact with a side of the saw-blade; a mounting body which is rotatable opposite the wall around a shaft extending perpendicularly of the direction of movement and parallel to the wall and which is provided with a protrusion which is movable into the opening arranged in the saw-blade; and urging means for urging the mounting body to a mounting position wherein the protrusion extends into the opening arranged in the saw-blade. Mounting takes place because via the sphere the saw-blade generates a moment in clockwise direction relative to the shaft. This moment is counteracted by a moment that is generated by the friction between the actuating rod and the contact surface.

9 Claims, 3 Drawing Sheets

SAW-BLADE FIXATION DEVICE

CROSS-REFERENCE TO RELATED APPLICATIONS

This application claims the priority of Dutch Application No. 9201371, filed Jul. 29, 1992 under 35 U.S.C. §119.

BACKGROUND OF THE INVENTION

The present invention relates to a device for fixing or mounting a saw-blade to a carrier which is connected to a drive device to make a reciprocating movement. The saw-blade is of the type having an opening therein.

Such devices are generally known. Such known devices are often applied for example in power jigsaws or so-called all-purpose saws.

The connection between the saw-blade and carrier in the mounting devices forming part of the prior art is mostly in the form of an element that presses the saw-blade against the carrier by means of a screw connection. Guide formations are usually arranged to determine the correct position of the saw-blade on the carrier.

The use of a screw makes it necessary to employ a screwdriver or a socket head wrench to fix a saw-blade in the saw or to remove a saw-blade therefrom. When using electrical hand tools the use of a screwdriver or the like is of course less desirable. Further, there is the possibility of this tool being misplaced, still further, the use of a hand tool is time-consuming.

The object of the present invention is to provide a mounting device in which the saw-blade is securely mounted on a carrier capable of performing a reciprocating movement, and wherein no extra tool is necessary for mounting or removing the saw-blade.

SUMMARY OF THE INVENTION

The object of the invention is achieved in that the mounting device is provided with a wall extending in the direction of movement which is suitable for contact with a side of the saw-blade. A mounting body is rotatable opposite the wall by a shaft extending perpendicularly of the direction of movement and parallel to the wall, the body is provided with a protrusion that is movable into the opening arranged in the saw-blade. Biasing means urge the mounting body to a mounting position wherein the protrusion extends into the opening arranged in the saw-blade.

Other features which improve the practical value of the mounting device will become apparent from the description to follow.

BRIEF DESCRIPTION OF THE DRAWINGS

The present invention will now be described with reference to the accompanying drawing, in which.

DETAILED DESCRIPTION

Figure 1:
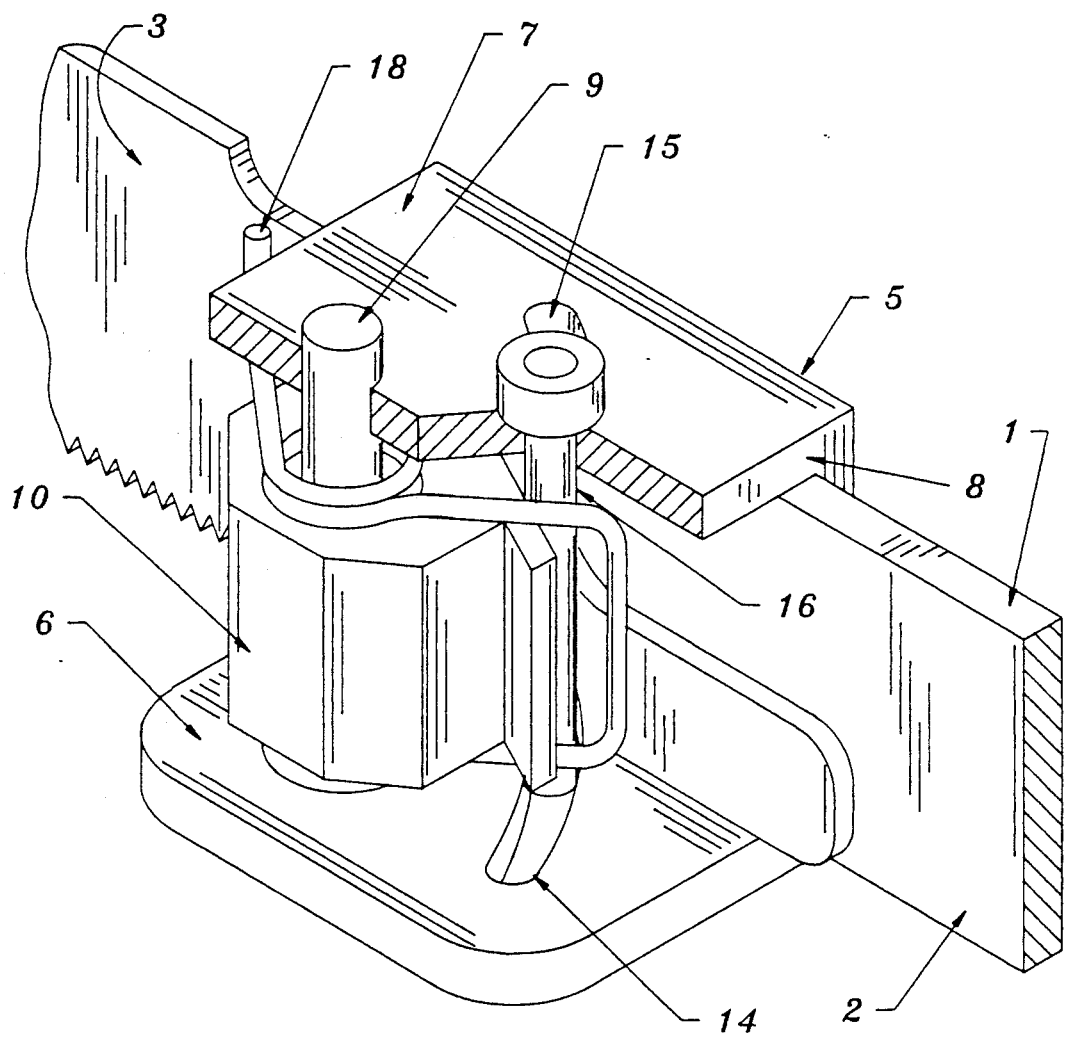
FIG. 1 shows a perspective, partially broken away view of a according to the present invention.
Figure 2:
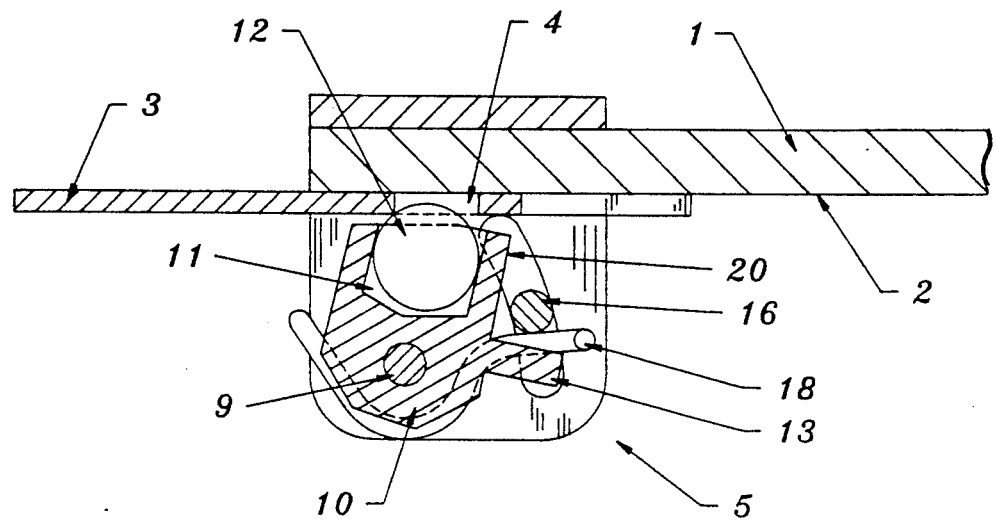
FIG. 2 shows a cross sectional view of the mounting device depicted in FIG. 1.
Figure 3:
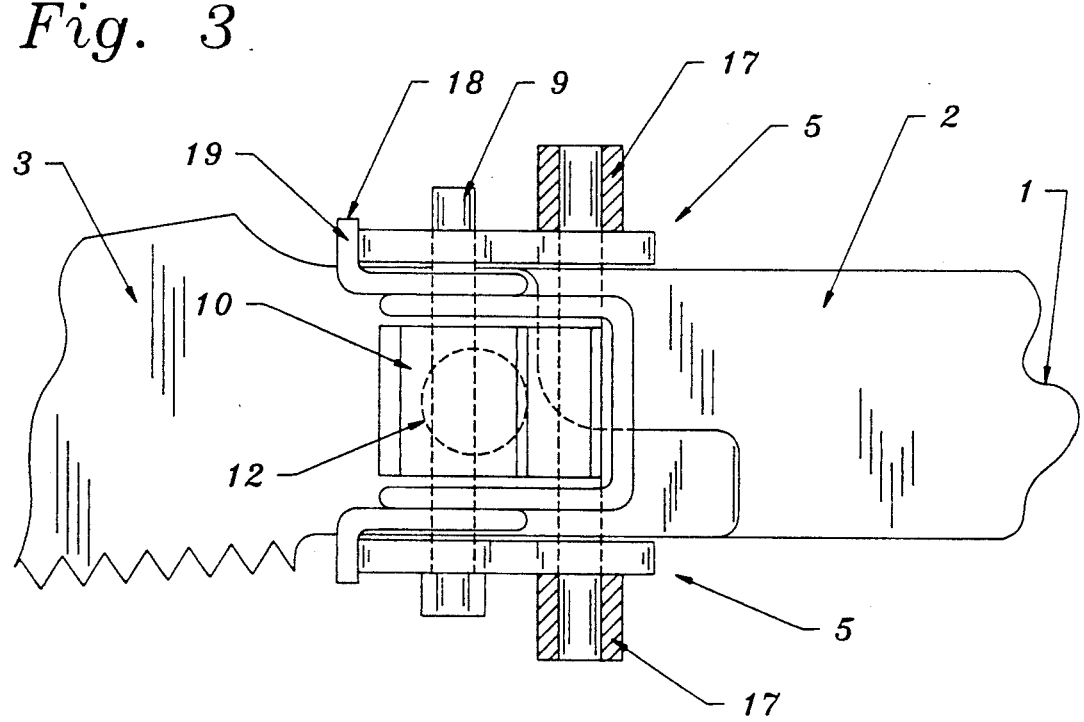
FIG. 3 is a partial side view and section of the mounting device shown FIG. 1.

Depicted in FIGS. 1, 2 and 3 is a carrier 1 which is connected to a drive device (not shown in the drawing) which is constructed and connected to the carrier such that the carrier 1 can perform a reciprocating movement. The carrier 1 comprises a planar wall 2 against which a saw-blade 3 can be positioned.

The saw-blade 3 is provided with an opening 4. Although it is recommended that a circular opening be applied, this is in no way necessary; it is possible to use a differently shaped opening.

A U-shaped bracket 5 is fixed to the carrier 1. The U-shaped bracket comprises two side pieces 6, 7 which are placed mutually opposite and which are connected by a back portion 8. Arranged in each of the side pieces 6,7 is an opening through which extends a shaft 9. The back portion can also be formed by the carrier 1 if the bracket is formed integrally with the carrier.

A mounting body 10 is fixed on the shaft. The body is provided with a cavity 11 in which captured a clamping member 12 embodied in the present embodiment as a ball or sphere. The mounting body is further provided with a protrusion 13.

The side pieces 6, 7 contain identical slots 14 and 15, respectively. An actuating rod 16 extends through the slots 14, 15. For mounting purposes sleeves 17 are clamped onto both ends of the actuating rod 16. The design of the slots 14, 15 is such that the actuating rod 16 is always disposed between a contact wall 20 of the body 10 and the protrusion 13 thereof.

A spring 18 wound from wire is further provided. The spring extends from the end 19 which abuts the upper side piece 7, to the shaft 9 and is wound approximately one and a half times therearound. The spring then extends against the actuating rod 16, is bent downward and again extends along the actuating rod 16 to the shaft 9. The spring 18 is again wound one and a half times around the shaft 9 and finally ends against the lower side piece 6. The winding direction and the dimensions of the spring are selected such that the spring exerts a force on the actuating rod 16 such that this rod is urged in the slots 14, 15 towards the carrier 1. Instead of this spring construction it is of course possible to apply other spring configurations.

The operation of this device will now be described.

With the embodiment shown in FIGS. 1, 2 and 3, when no saw-blade is inserted the actuating rod 16 is urged by the spring 18 into contact with the contact wall 20 of the body 10. Since the body 10 can move freely about the shaft, the body will rotate in a counter-clockwise direction until the ball 12 engages planar surface 2 of the carrier.

The saw-blade 3 is introduced from the left-hand side between the sphere 12 and the carrier 1. To facilitate insertion, the actuating rod 16 is moved manually (by grasping the sleeves 17) counter to the spring pressure, whereby the fixation body 10 with the ball 12 can rotate freely and the saw-blade 3 can be inserted.

The insertion movement is continued until the sphere 12 falls into the opening 4 in the saw-blade. Thereafter, the user can release the actuating lever 16 which will be urged by spring pressure into contact with the contact surface 20. Secure mounting takes place because the ball 12 engages the opening 4 in the saw-blade and generates a moment in a clockwise direction relative to the shaft 9. This moment is counteracted by a moment that is generated by the friction between the actuating rod 16 and the contact wall 20.

Because the angle between the contact wall 20 and the path that the actuating rod 16 can traverse in slots 14, 15 is acute, the friction force therebetween exceeds the moment generated by the saw-blade so that the device can withstand shocks endured by the saw-blade, for example when the saw jams. It is important here that the angle enclosed between the contact wall 20 and the path to be traversed by the actuating rod 16 in the slots 14, 15 be very small, so that the friction force acting between the contact wall 20 and the actuating rod 16 is a normal force. This normal force forms for the greater part a transverse force and is thus absorbed by the right-hand edge of the slots 14 and 15.

Secure mounting thus is effected in the following manner. When the saw-blade 3 is subjected to forces which tend to pull the saw-blade 3 out of the mounting device, the clamping ball 12 is rotated together with the body 10 by the saw-blade 3 such that the ball 12 presses the saw-blade 3 against the carrier 1. The clamping action is thus reinforced and it is impossible for the saw-blade to be moved outward.

Conversely, if the saw-blade 3 is subjected to a force which pushes the saw-blade 3 inward, an attempt is then made to rotate the body 10 toward the actuating rod 16. However, this is prevented by the friction force between the surface 20 in contact with the fixation body 10 and the actuating rod 16. As a result of the shapes and position of the slots 14, 15, the rod 16 can only move substantially parallel to the contact surface. Secure mounting thus also is effected in this direction.

When the mounting mechanism must be released, the actuating rod 16 only has to be removed manually from the contact surface 20, which is easily done because, as stated, the friction force is a normal force, and the mounting body 11 is easily released. Accordingly, it is then easy to remove the saw-blade simply by grasping the sleeves 17.

Figure 4:
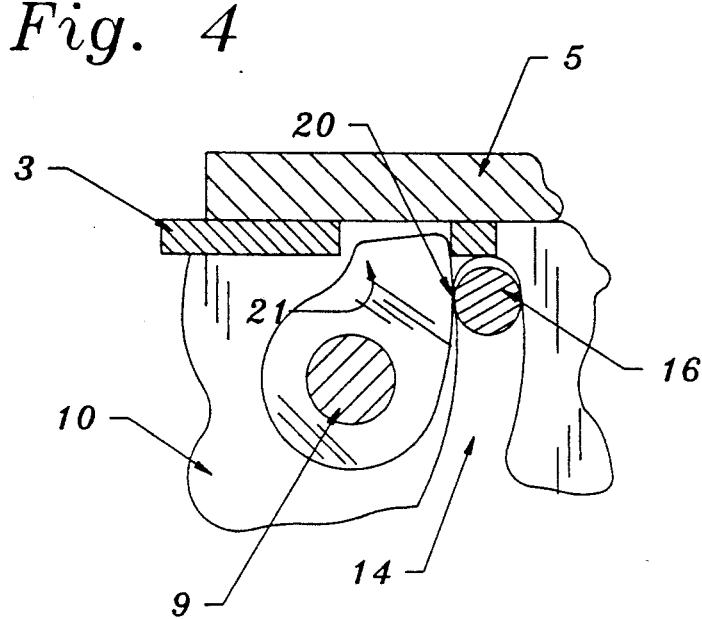
FIG. 4 show a cross section of a second embodiment of the mounting device shown in FIG. 1.

In the above described embodiment a separate sphere is described which is freely rotatable in the body 11. It is however also possible to fix a protrusion on the mounting body which assumes the function of the sphere. Such an embodiment is shown in FIG. 4. Therein, the body 10, which takes a slightly more rounded form in this embodiment, is provided with a protrusion 21 pivotally mounted on the shaft 9. The essential difference lies in the fact that the protrusion cannot rotate relative to the body 10; this drawback can be minimized by a suitable design, choice of material and lubrication. This embodiment otherwise corresponds with the embodiment shown in FIGS. 1, 2 and 3.

Figure 5:
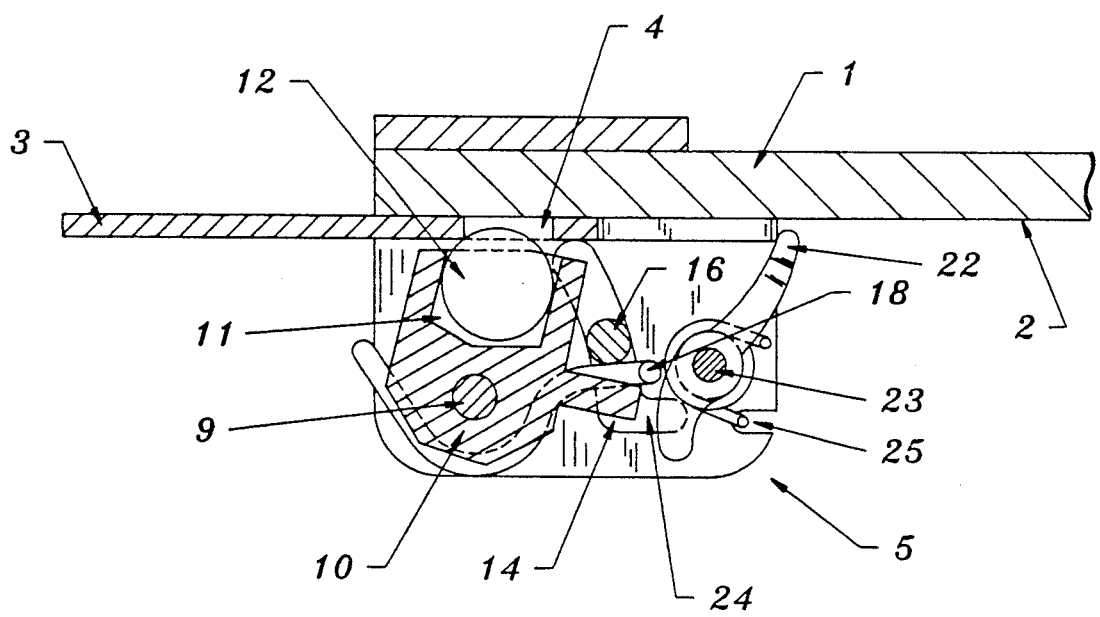
FIG. 5 shows a cross section of a modification of the embodiment shown in FIGS. 1-3.

Finally, FIG. 5 shows an embodiment wherein the mounting of the saw-blade takes place automatically. For this purpose a lever 22 is arranged which is rotatably disposed relative to the U-shaped bracket 5 by means of a shaft 23. The bottom slot 14 is further provided with an extension 24 into which the actuating rod 16 can be moved. One end of the lever 22 extends into the vicinity of the carrier 1, while the other end of the lever 22 extends over the extension 24. In the starting position, the actuating rod 16 is in the extension 24 of the slot 14. The mounting body 10 is thus unlocked and the saw-blade can be inserted. When the saw-blade has been inserted sufficiently far, it contacts the lever 22 which will rotate relative to the bracket 5 and will force the actuating lever 16 out of the extension 24 into the slot 14, whereafter it is urged into the mounting position by means of spring pressure generated by the spring 18. Thereafter, the mounting is obtained as already has been described with reference to FIG. 1–3.

When the saw-blade is taken out, the rod 16 is moved manually into the recess 24, whereby the body 10 is released, and the lever 22 is actuated whereby the saw-blade 3 is ejected. A spring 25 is provided which urges the lever 22 to the position in which the saw-blade is ejected.

What is claimed is:

1. A device for mounting a saw-blade provided with an opening to a carrier which is connected to a drive device to make a reciprocating movement comprising: a wall extending in the direction of movement of the drive device which is suitable for contact with a side of the saw-blade; a mounting body which is rotatable opposite the wall around a shaft extending perpendicularly to the direction of movement and parallel to the wall and which is provided with a protrusion which is movable into the opening arranged in the saw-blade; and urging means for urging the mounting body to a mounting position wherein the protrusion extends into the opening arrange din the saw-blade.

2. The device as claimed in claim 1 wherein the protrusion is at least partially spherical and the dimension of the opening in the saw-blade is smaller in the direction of movement than the diameter of the at least partially spherical protrusion.

3. The device as claimed in claim 1 or 2 wherein the protrusion forms part of a clamping body that is arranged at least partially in a cavity present in the mounting body, and which is urged by spring pressure means into the opening in the saw-blade.

4. The device as claimed in claim 1 or 2 wherein the mounting body is pivotally supported by a shaft extending transversely of the direction of movement and parallel to the wall, said shaft being mounted in a U-shaped frame which is attached to the carrier.

5. The device as claimed in claim 4 wherein the urging means is formed by an actuating body movable along a path in substantially tangential direction relative to the mounting body, the path permitting the actuating body to contact surface when the mounting body is in the mounting position, thereby subjecting the mounting body to a friction force from the actuating body to prevent forces exerted by the saw-blade from affecting the position of the mounting body.

6. The device as claimed in claim 5 wherein the actuating body is formed by a pin which extends through a slot arranged in each of the legs of the U-shaped frame, each slot extending substantially parallel to the contact surface of the mounting body.

7. The device as claimed in claim 6 wherein each slot is curved and the contact surface of the mounting body is curved, and a radii of curvature of the contact surface and the slot are substantially the same.

8. The device as claimed in claim 6 or 7 wherein an element is arranged for urging the pin into contact with the mounting body.

9. The device as claimed in claim 5, 6, 7 or 8 wherein the actuating member can assume a rest position lying outside the path, and a lever extends into the path of the saw-blade and pushes the actuating body from the rest position into the path when the saw-blade is mounted in said device.

* * * * *